E. E. & D. E. GRAY.
SEED PACKAGE.
APPLICATION FILED AUG. 2, 1912. RENEWED OCT. 1, 1915.

1,160,279.                                   Patented Nov. 16, 1915.

Witnesses
Robert F. Weir
Arthur B. Framke

Inventors
Edward E. Gray,
David E. Gray,
by Geo. E. Waldo, Atty.

UNITED STATES PATENT OFFICE.

EDWARD E. GRAY, OF PLANO, AND DAVID E. GRAY, OF HIGHLAND PARK, ILLINOIS, ASSIGNORS, BY MESNE ASSIGNMENTS, TO AMERICAN SEEDTAPE COMPANY, OF CHICAGO, ILLINOIS, A CORPORATION OF ILLINOIS.

SEED-PACKAGE.

1,160,279.	Specification of Letters Patent.	Patented Nov. 16, 1915.

Application filed August 2, 1912, Serial No. 712,990. Renewed October 1, 1915. Serial No. 53,657.

*To all whom it may concern:*

Be it known that we, EDWARD E. GRAY and DAVID E. GRAY, citizens of the United States, and residents, respectively, of Plano, in the county of Kendall and State of Illinois, and of Highland Park, in the county of Lake, in said State, have invented a certain new and useful Improvement in Seed-Packages, of which the following is a specification.

Our invention relates to an improved seed package for the purpose of facilitating the planting of the seeds and consists essentially of a strip of fibrous material adapted to constitute, wholly or in part, the inclosing medium of the seeds.

An essential feature of our invention consists in so constructing the seed package that the requisite strength may be imparted thereto by securing to it, as it is formed, a reinforcing member, such as a string or narrow strip of fibrous or tenacious material. The material employed is a strip of paper either folded to inclose the seeds or two strips of paper may be so employed and in any event the package is securely closed by means of a strip of adhesive, as glue, applied to the strip or strips of paper.

After the seeds have been secured to the strip of fibrous material, they may be inclosed in any one of a number of ways either by folding the strip about the seeds, or by securing to such strip a second similar strip of fibrous material. The package thus formed, as it leaves the machine, may be wound upon suitable reels to facilitate handling.

Our improved seed package is adapted to be planted by making a continuous furrow of the proper depth in the ground and laying the package therein, the spacing of the seeds in the forming of the package serving to properly distribute the seeds in the ground. The material used to inclose the seeds is of such a nature as to be readily disintegrated by the action of the moisture in the ground, as a result of which no interference is offered to the sprouting and growth of the seeds.

Figure 1:
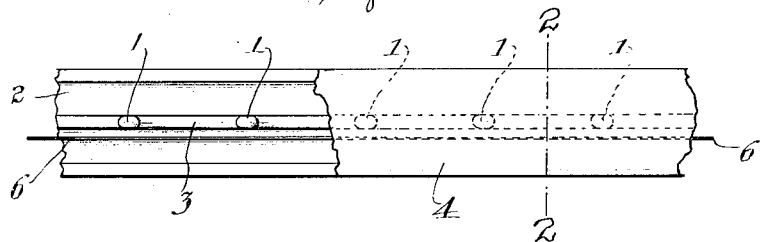
Figure 2:
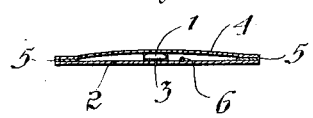

The several drawings illustrating our invention are as follows:

Figure 1 is a plan view of a section of the seed tape formed in accordance with our invention in which a longitudinally disposed reinforcing member is shown; Fig. 2 is a cross-sectional view of the tape shown in Fig. 1 taken along the line 2—2; and Figs. 3 and 4 show, in views similar to Fig. 2 modified forms of seed tape adapted to be reinforced in a manner similar to that shown and described in connection with Figs. 1 and 2.

Similar numerals refer to similar parts throughout the several drawings.

As shown in Figs. 1 and 2, the seeds 1 are secured to a tape 2 by means of a suitable adhesive 3, preferably fish glue or the like. The seeds thus secured to the tape 2 are covered by a second thickness of fibrous material 4, which is secured to the tape 2 by means of strips 5 of adhesive material, preferably fish glue, along the edges of the tape 2. Extending between the tape 2 and the cover strip 4 is a longitudinal reinforcing means 6 which may consist of a string or thread or any suitable strip of fibrous material adapted to increase the tensile strength of the seed package. This reinforcing member may be engaged by the adhesive 3 or not, as desired. The seed package thus formed has marked advantages over those before produced in that the material used to inclose the seeds may be relatively very thin and weak and thus readily disintegrated by the action of the moisture in the ground, since the longitudinal reinforcing member 6 imparts to the package a sufficient strength to prevent it being accidentally drawn apart in handling the tape.

Figure 3:
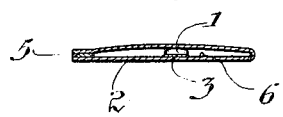
Figure 4:
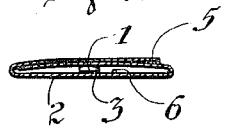

In order to show the applicability of our means for reinforcing the seed package, we have shown in Fig. 3 a form of tape in which the strip of fibrous material 2 is wider than that used in Fig. 1 and, after the seeds 1 and reinforcing medium 6 are placed thereon, a part of the strip 2 is folded over the seeds and reinforcing medium and held in place by a strip 5 of adhesive material such as glue.

The applicability of our invention is also shown in a further modified form of seed tape indicated in Fig. 4 in which a wider strip of fibrous material is taken than the strip shown in Fig. 3 and after the seeds 1 and reinforcing means 6 are placed thereon, as described in connection with Fig. 1, the two edges of the strip are both folded over the seeds and held in place by the strip of glue 5.

It is to be observed that regardless of the conformation of the seed tape, the reinforcing means serves to increase the tensile strength of the seed package without increasing the thickness and resistance to growth of the inclosing material of the seed package. A further advantage of the seed package disclosed consists in its flat construction, as a result of which it may be readily wound upon reels and marketed and it is pointed out that any one of the different forms of tape shown may be readily handled in this way, and that, in connection with the modification shown in Fig. 4, it is desirable that both edges of the material 2 should pass entirely over the seeds in order to produce a tape or package that will wind evenly upon the shipping spool or reel.

Whatever construction is employed in connection with our improved reinforcing means, it is desirable that the material covering the seeds be sufficiently strong to prevent puncture of the material by the seeds when the seed tape is wound upon the shipping spool or reel.

While we have shown our seed package in the particular embodiments herein described, we do not, however, limit ourselves to these constructions, but desire to claim any equivalent constructions in which a reinforcing means is used for the tape.

We claim:—

1. Seed tape comprising a plurality of thicknesses of fibrous material, means for securing said thicknesses together, seeds secured between thicknesses of said tape, the thicknesses of said tape being disposed to prevent puncture thereof when wound upon a reel, and a reinforcing means extending lengthwise of said tape.

2. Seed tape comprising a plurality of thicknesses of fibrous material secured together by means of an adhesive, seeds secured between thicknesses of said tape, the thicknesses of said tape being disposed to prevent puncture thereof when wound upon a reel, and a reinforcing means extending lengthwise of said tape.

3. Seed tape comprising a plurality of thicknesses of fibrous material, means for securing said thicknesses together, seeds secured between thicknesses of said tape by means of an adhesive, the thicknesses of said tape being disposed to prevent puncture thereof when wound upon a reel, and a reinforcing means extending lengthwise of said tape.

4. Seed tape comprising a plurality of thicknesses of fibrous material, means for securing said thicknesses together, seeds secured between thicknesses of said tape, and a reinforcing means extending lengthwise of said tape.

5. Seed tape comprising a plurality of thicknesses of fibrous material secured together by an adhesive, seeds secured between thicknesses of said tape, and a reinforcing means extending lengthwise of said tape.

6. Seed tape comprising a plurality of thicknesses of fibrous material, means for securing said thicknesses together, seeds secured between thicknesses of said tape by means of an adhesive, and a reinforcing means extending lengthwise of said tape.

7. Seed tape comprising a strip of fibrous material, seeds secured thereto, and reinforcing means applied to said tape and extending lengthwise thereof.

8. Seed tape comprising a strip of fibrous material, seeds secured thereto by an adhesive, and a reinforcing means applied to said strip and extending lengthwise thereof.

9. Seed tape comprising a strip of paper, seeds secured thereto, and a string applied to said strip and extending lengthwise thereof.

10. Seed tape comprising a plurality of thicknesses of paper, means for securing said thicknesses together, seeds secured between thicknesses of said paper, and a string applied to said tape and extending lengthwise thereof.

In testimony whereof, we hereunto subscribe our names this 29th day of July, A. D., 1912.

EDWARD E. GRAY.
DAVID E. GRAY.

Witnesses:
S. J. Dorvis,
Mary H. Bixel.